United States Patent
Milito et al.

(10) Patent No.: US 11,663,315 B2
(45) Date of Patent: May 30, 2023

(54) JUST-IN-TIME AUTHENTICATION

(71) Applicant: MASTERCONTROL, INC., Salt Lake City, UT (US)

(72) Inventors: Chad Milito, Ogden, UT (US); Terrance Lanham Holbrook, Bountiful, UT (US); Brian Curran, Draper, UT (US); Alan Rencher, Salt Lake City, UT (US)

(73) Assignee: MasterControl Solutions, Inc., Salt Lake City, UT (US)

( * ) Notice: Subject to any disclaimer, the term of this patent is extended or adjusted under 35 U.S.C. 154(b) by 23 days.

(21) Appl. No.: 17/163,048

(22) Filed: Jan. 29, 2021

(65) Prior Publication Data

US 2021/0342435 A1 Nov. 4, 2021

Related U.S. Application Data

(60) Provisional application No. 63/019,106, filed on May 1, 2020.

(51) Int. Cl.
*G06F 21/00* (2013.01)
*G06F 21/44* (2013.01)

(52) U.S. Cl.
CPC .................... *G06F 21/44* (2013.01)

(58) Field of Classification Search
CPC ........................................ G06F 21/44
See application file for complete search history.

(56) References Cited

U.S. PATENT DOCUMENTS

| | | | |
|---|---|---|---|
| 2010/0069732 A1* | 3/2010 | Reggiardo | G16H 40/40 600/365 |
| 2012/0240220 A1* | 9/2012 | Smith | G06F 21/34 726/17 |
| 2016/0196390 A1* | 7/2016 | Guertin | G16H 10/60 705/2 |
| 2017/0329399 A1* | 11/2017 | Azam | G06F 3/017 |

\* cited by examiner

*Primary Examiner* — Philip J Chea
*Assistant Examiner* — Rodman Alexander Mahmoudi
(74) *Attorney, Agent, or Firm* — Workman Nydegger P.C.

(57) ABSTRACT

A computer system for just-in-time authentication displays a user interface comprising a first portion and a second portion. The first portion of the user interface is associated with a first permission attribute, and the second portion of the user interface is associated with a second permission attribute. The first permission attribute is associated with a first user and the second permission attribute is associated with a second user. The computer system receives, from one or more proximity sensors, a proximity of the second user relative to the user interface. The computer system also receives, from an identity-verification sensor, a verification of an identification of the second user. Further, the computer system activates the second portion of the user interface for interaction from the second user.

13 Claims, 4 Drawing Sheets

JUST-IN-TIME AUTHENTICATION

CROSS-REFERENCE TO RELATED APPLICATIONS

This application claims priority to and the benefit of U.S. provisional application Ser. No. 63/019,106 entitled "JUST-IN-TIME AUTHENTICATION," filed on May 1, 2020, which is incorporated by reference herein in its entirety.

BACKGROUND

Computers and computing systems have affected nearly every aspect of modern living. Computers are generally involved in work, recreation, healthcare, transportation, entertainment, household management, etc. The proliferation of computers throughout industrial and commercial spaces has led to government and industrial regulation of software and computer systems within many different business sectors.

Various government agencies exert regulatory control over companies within their jurisdictions. For example, pharmaceutical companies and manufacturers, medical device makers, and clinical research organizations are all subject to compliance regulations. These compliance regulations ensure that the companies are producing items that are safe for patients.

Similarly, many industries and companies have developed standards and procedures to ensure that processes are properly executed and that products are properly manufactured. Many of these standards and procedures utilize computer-based verifications and/or human-based verifications. For example, one or more human users may be required to ensure that a particular parameter on a manufacturing line remains within a specified range. Software may be implemented to record the users' data entries relating to the particular parameter over time. As such, an auditable record of the verification is created, and the value of the parameter can be tracked over time. In order for the auditable record to have the desired effect, there is a need for secure authentication throughout the data entry process.

As the usage of computers has continued to expand and become more vital to society, an increased need for security solutions has also become urgent. In order to maintain secure computing, it is important for users to be properly validated and for permissions to be enforced to ensure that users have only the appropriate amount of control and access to a computer system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include computer systems, methods, and computer-readable media for just-in-time authentication. The computer system displays a user interface comprising a first portion and a second portion. The first portion of the user interface is associated with a first permission attribute, and the second portion of the user interface is associated with a second permission attribute. The first permission attribute is associated with a first user and the second permission attribute is associated with a second user. The computer system receives, from one or more proximity sensors, a proximity of the second user relative to the user interface. The computer system also receives, from an identity-verification sensor, a verification of an identification of the second user. Further, the computer system activates the second portion of the user interface for interaction from the second user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

User authentication is a fundamental component of computer security. For example, most modern operating systems utilize a permission scheme, such as POSIX, that defines what different users and processes within the operating system are allowed to access, execute, read, write, and/or otherwise interact with. A basic example of such a system may comprise an administrative user that is able to access and manipulate any file on the computer system, including system files. In contrast, a standard user may only be able to access and manipulate files that are within a particular user space that was created for that standard user.

By implementing a permission scheme, the computer system is able to verify that only particular users are able to do specific functions. Similar permission schemes may be implemented by individual software applications. For example, some software applications may require that some information be entered and verified by a first employee, while other information must be entered and verified by the manager. For instance, a quality control system may require that a first employee enter data relating to the temperature of a food item being processed in a plant. A manager may then be required to enter information and/or validate that the recorded temperature is correct and within acceptable operating parameters.

In cases where multiple users are using a shared user interface, the authentication process can be a burden and create delays as each user is required to enter their authentication information each time they enter information. During the authentication process, only the authenticated user is able to use the shared user interface. Once they finish their task, they must logout of the system and another user must authenticate themselves to begin interacting with the common user interface. This process of authentication and deauthentication is used within conventional systems to ensure that permissions are correctly honored.

Embodiments disclosed herein provide an improved system for authentication. Specifically, disclosed embodiments provide for "just-in-time authentication." Just-in-time authentication allows for a seamless authentication experience when multiple users are using a shared user interface. For example, disclosed authentication systems may utilize a combination of sensor data and machine learning algorithms to identify a particular user and authenticate that user without requiring direct interaction from the user. Further, disclosed embodiments may also prepare a particular portion of a user interface for interaction from the user based upon the user's authentication. Accordingly, disclosed embodiments provide best-practices computer security while improving the efficiency of the authentication process.

Figure 1:
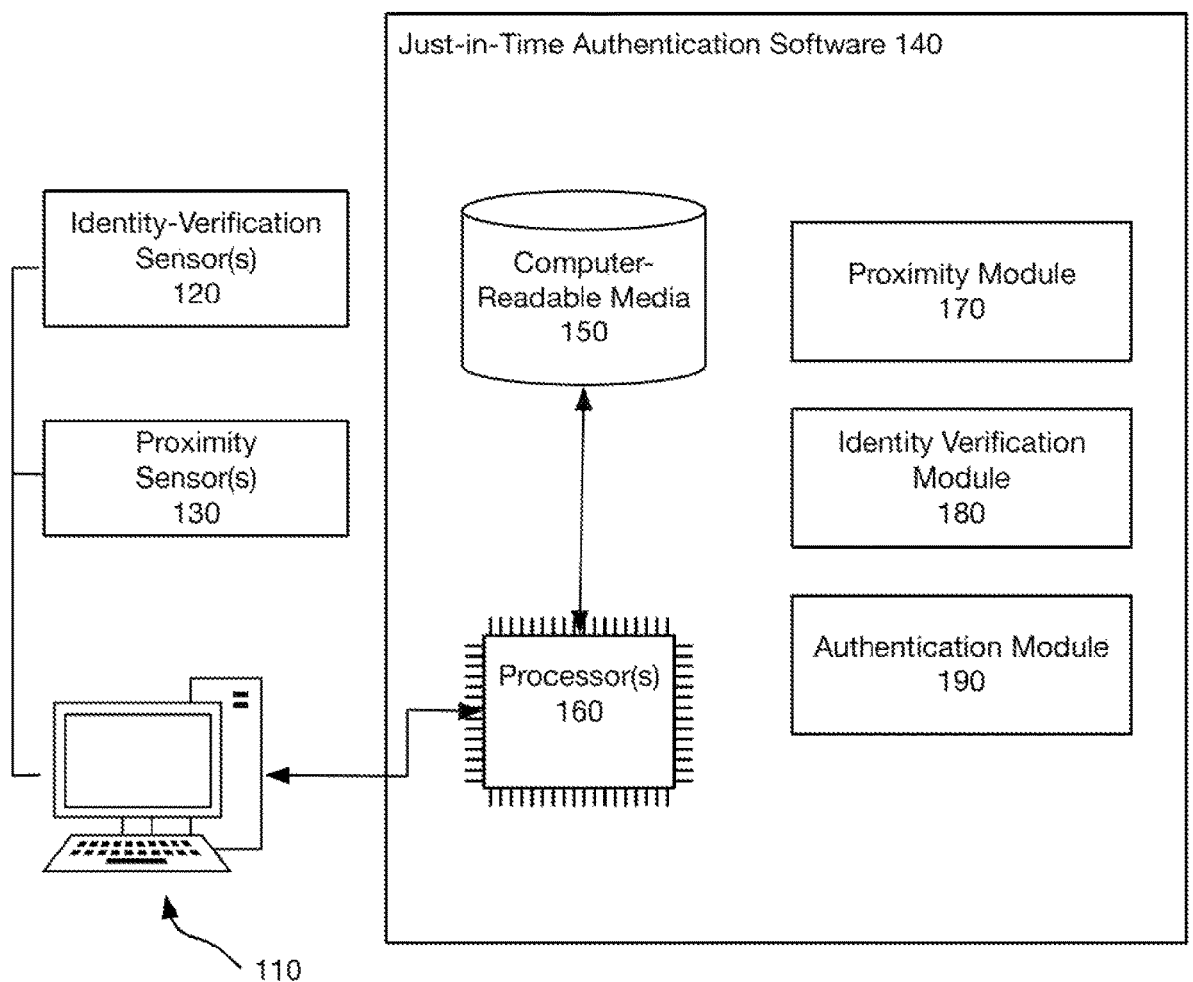
FIG. 1 illustrates a schematic diagram of an embodiment of a computer system for just-in-time authentication.

Turning now to the figures, FIG. 1 illustrates a schematic diagram of an embodiment of computer system 110 for just-in-time authentication. The computer system 110 is in communication with one or more identity-verification sensor(s) 120 and one or more proximity sensor(s) 130. The one or more identity-verification sensor(s) 120 may comprise sensors that determine the identity of a user, including biometric sensors such as, but not limited to, fingerprint sensors, retinal scanners, heart-rate sensors, or facial recognition cameras. The one or more proximity sensor(s) 130 may comprise sensors that determine a proximity and/or location of an individual such as, but not limited to, NFC sensors, facial recognition cameras, GPS sensors, or RFID sensors. In at least one embodiment, a particular sensor unit is both a proximity sensor 130 and an identity-verification sensor 120.

The computer system 110 also is depicted as comprising one or more processor(s) 160 and computer-readable media 150. The one or more processor(s) 160 and computer-readable media 150 together execute a just-in-time authentication software application 140. The just-in-time authentication software application 140 comprises and/or interacts with a proximity module 170, an identity verification module 180, and an authentication module 190.

As used herein, a "module" comprises computer executable code and/or computer hardware that performs a particular function. One of skill in the art will appreciate that the distinction between different modules is at least in part arbitrary and that modules may be otherwise combined and divided and still remain within the scope of the present disclosure. As such, the description of a component as being a "module" is provided only for the sake of clarity and explanation and should not be interpreted to indicate that any particular structure of computer executable code and/or computer hardware is required, unless expressly stated otherwise. In this description, the terms "component", "agent", "manager", "service", "engine", "virtual machine" or the like may also similarly be used. Additionally, one will appreciate that the "computer system 110" described herein may comprise a single computer or multiple computers, including cloud computers, that are in communication over a network.

The computer system 110 may display a user interface comprising a first portion and a second portion. The first portion is associated with a first permission attribute, and the second portion is associated with a second permission attribute. The first permission attribute is associated with a first user and the second permission attribute is associated with a second user. In some cases, the first portion and second portion may not be simultaneously displayed, while in other cases the first portion and second portions comprise different portions of the displayed user interface and as such are displayed simultaneously.

In at least one embodiment, the first portion of the screen may comprise one or more text boxes, radio buttons, sliders, or other user data-entry features. Additionally, the second portion of the screen may comprise one or more other text boxes, radio buttons, sliders, or other user data-entry features. For example, a single user interface display may depict a text box that is configured for a technician to enter a number indicating a current parameter. The single user interface display may also depict a checkbox that is configured for a manager to click to indicate that the manager has verified that the entered data is correct. Both the technician and the manager may enter their respective data into the same user interface on the computer system. Accordingly, an auditable record has been created that indicates that both the technician and the manager verified that the parameter was within expected operating thresholds.

As an additional example, the user interface may comprise a process validation interface for a medical device company. The user interface may be displayed on a tablet-like device that is positioned near a quality control station. A quality assurance technician may be required to enter the results of quality assurance tests into the user interface. A quality assurance manager may also be required to enter testing results for an entire batch of devices. In at least one embodiment, both the data entry fields for the quality assurance technician and the data entry fields for the quality assurance manager are displayed simultaneously by the tablet-like device. Both the quality assurance technician and the quality assurance manager may be associated with different permissions such that the data entries can be audited with the assurance that the proper employee entered the respective data.

Continuing the example, the quality assurance technician may already be validated within the system. After the quality assurance technician enters a test result into the user interface, a proximity module 170 within the computer system 110 may receive, from one or more proximity sensors 130, a proximity of the second user (e.g., the quality assurance manager) relative to the user interface. For instance, the one or more proximity sensors 130 may receive a signal from an NFC device that the quality assurance manager is wearing. In this example, each user within the facility may be associated with a personal NFC device, such as a smart phone, smart watch, or some other NFC device. Using the signal information from the NFC device, the computer system 110 is able to determine a relative distance between the quality assurance manager and the user interface.

In addition to identifying a proximity of a user, the computer system 110 also receives, from an identity-verification sensor 120, a verification of an identification of the user. For example, the mere detection of the NFC device may not be sufficient to identify the user because another individual may be carrying the quality assurance manager's NFC device. Accordingly, the one or more identity-verification sensors 120 provide an identity verification module 180 within the computer system 110 with a verified identity of a user.

For example, the quality assurance manager may be wearing a watch that tracks his or her heart rate. The watch may need to be password authenticated (or otherwise authenticated) when it is put on. The watch may be further configured to deauthenticate if it no longer detects a heartbeat. As such, the watch is authenticated by the quality assurance manager when he or she first puts it on and will deauthenticate as soon as he or she takes it off. Additionally, the watch may also have an integrated NFC function, such that the watch functions as both an identity-verification sensor 120 and a proximity sensor 130. Alternatively, the user interface may be associated with a camera that performs facial recognition to verify the identity of the quality assurance manager. As such, the computer system 110 receives sensor data verifying the identity of the quality assurance manager.

While the above described embodiment utilizes particular types of sensors used to validate the presence and identity of a user, additional or alternative embodiments of the present invention may utilize a number of different types of sensors including, but not limited to, facial recognition sensors (e.g., video cameras, lidar, depth cameras, etc.), biometric sensors (e.g., pulse-oximeter sensors), barcode readers, password keypads, fingerprint, iris scanners, speech recognition sensors, hand geometry sensors, and other similar sensor types. Additionally, at least one embodiment comprises environmental cameras that utilize artificial intelligence and other image recognition techniques to identify people based upon gait and/or behavioral patterns. Additionally, in at least one embodiment, one or more of these sensors may be utilized as a second-factor authentication to further validate the location and/or identity of a user.

For example, a manufacturing line may have multiple cameras observing the entire manufacturing process. As individuals walk throughout the manufacturing lines a computer program, such as an image or pattern matching neural network, monitors each individual and identifies the individuals based upon gait and behavioral patterns. Using this information, the neural network functions as the one or more proximity sensors by identifying when a tracked user is near a computer screen and user interface and/or the one or more identity-verification sensors by validating the actual identity of the user. In such a system, the computer program can proactively validate users as they travel around the manufacturing line and interact with computers.

As described in part above, the one or more proximity sensors and the one or more identity-verification sensors may comprise the same physical sensor. For example, the one or more proximity sensors and the one or more identity-verification sensors may comprise a facial recognition sensor that is configured to track gaze direction. For instance, the computer system may receive from the one or more proximity sensors the proximity of the second user relative to the user interface by detecting, with the facial recognition sensor, that the second user is gazing at the user interface. Additionally, the computer system may receive from the one or more identity-verification sensors, the verification of the identification of the second user by detecting, with the facial recognition sensor, that the second user is gazing at the user interface. As such, the facial recognition sensor may function as both a proximity sensor and an identification sensor. Additionally in at least one embodiment, the gaze tracking sensor may identify where on the user interface the second user is gazing and validate the second user with respect to that particular area of the user interface.

Figure 2:
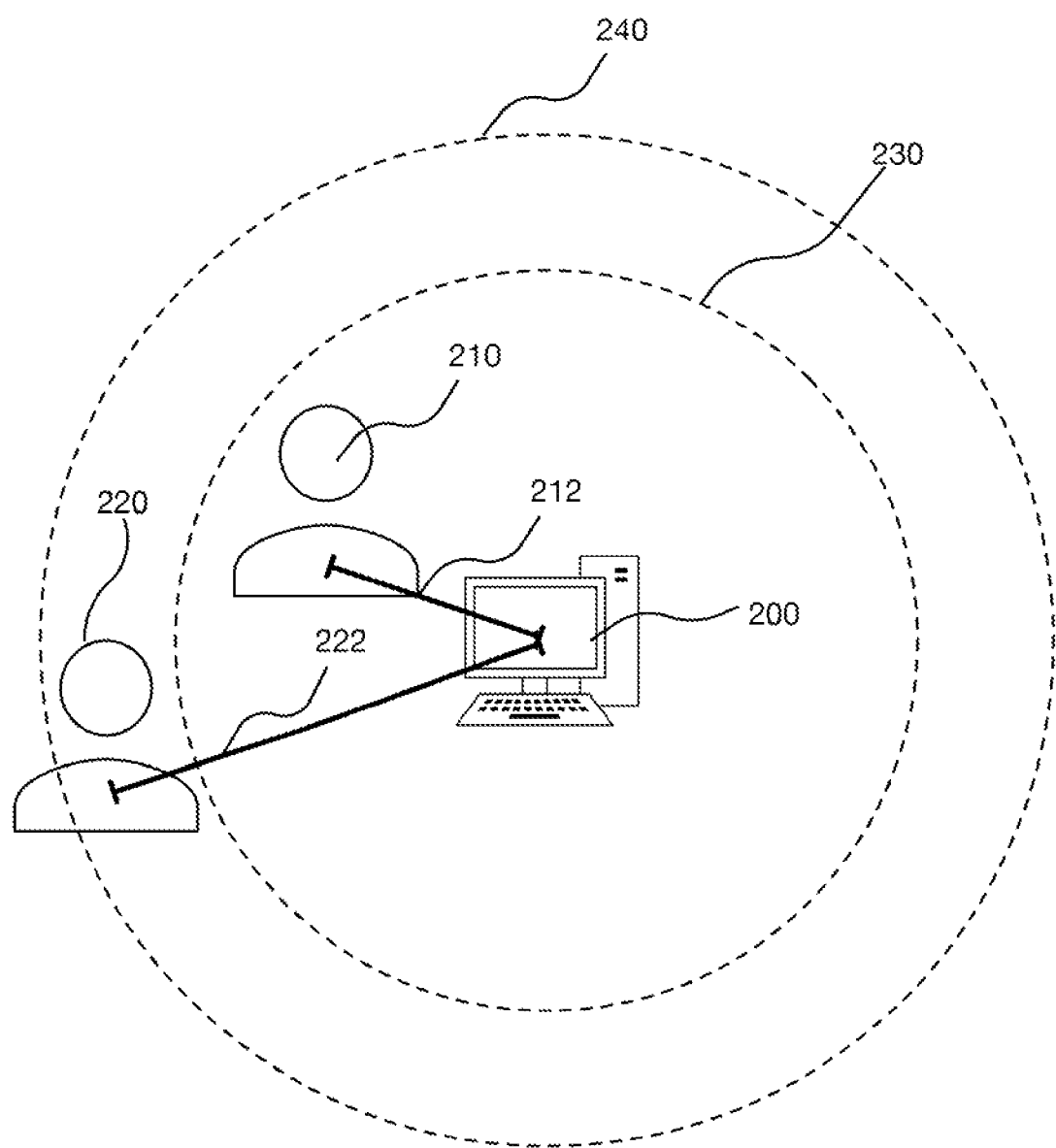
FIG. 2 illustrates a diagram of a first user and a second user positioned around a user interface.

FIG. 2 illustrates a diagram of a first user 220 and a second user 210 positioned around a user interface 200. Continuing our example from above, the first user 220 may be the quality assurance technician and the second user 210 may be the quality assurance manager. In at least one embodiment, prior to activating the second portion of the user interface 200, the computer system determines that the second user 210 is within a threshold distance 230, 240 from the user interface 200. For example, the computer system 110 may identify a relative distance 212 between the quality assurance manager and the user interface 200 based upon the strength of the NFC signal between the quality assurance manager and the user interface 200. Further, the computer system 110 may compare the relative distance 212 to a threshold distance 230, 240.

In at least one depicted embodiment, the proximity module 170 determines that only the second user 210 (i.e., the quality assurance manager) is within a threshold distance 230 of the user interface 200 using the one or more proximity sensors 130. Additionally, the identity verification module 180 verifies that the second user 210 is the quality assurance manager using the one or more identity-verification sensors 120. Accordingly, the authentication module 190 within the computer system 110 authenticates the second user and activates the second portion of the user interface for interaction from the second user 210. In some embodiments, once the second user 210 leaves the threshold distance 230, the authentication module 190 de-authenticates the second user 210.

In an additional or alternative embodiment, the computer system 110 determines that both the first user 220 and the second user 210 are within a threshold distance 240 from the user interface 200. In such a case, the proximity module 170 may utilize the one or more proximity sensors 130 to determine that the second user 210 is closer to the user interface than the first user 220. As such, the proximity module 170 determines that the second user 210 is the closest to the user interface 200 within the threshold distance 240, and the identity verification module 180 verifies that the second user 210 is the quality assurance manager using the one or more identity-verification sensors 120. Accordingly, the authentication module 190 authenticates the second user and activates the second portion of the user interface 200 for interaction from the second user 210. In some embodiments, once the distance 212 between the second user 210 and the user interface 200 is greater than the distance between the first user 220 and the user interface 200, the authentication module 190 deauthenticates the second user 210. Additionally, the authentication module 190 may deauthenticate a user once the user has moved away from the user interface 200 for a time greater than a threshold, such as five seconds.

In view of the above disclosure, one will appreciate that the computer system 110 is able to track the relative proximity of a user with respect to a user interface 200. Additionally, the computer system 100 is able to verify the identity of a user. The authentication module 190 is then able to perform just-in-time authentication by automatically authenticating the correct user into a computer system 100. As such, the authentication and deauthentication process occurs seamlessly without interruption.

Additionally, in at least one embodiment, the authentication module 190 will authenticate both the first user 220 and the second user 210 simultaneously. For example, the computer system 110 may determine that both the first user 220 and the second user 210 are within the threshold distance 240. The threshold distance 240 may be set close enough to the user interface 200 that it can be assumed that both the first user 220 and the second user 210 are in view of the user interface 200 and in control of the user interface 200. In such a scenario, prior to activating the second portion, the computer system 100 determines that both first user 220 and the second user 210 are within a threshold distance 240 from the user interface. The computer system 110 then activates both the second portion of the user interface for interaction with the first user 220 and the second portion of the user interface for interaction from the second user 210. Accordingly, a first portion of the user interface 200 that has permissions set for the first user 220 may allow data to be entered and edited. Simultaneously, a second portion of the user interface 200 that has permissions set for the second user 210 may allow data to be entered and edited. In such a case, both users can simultaneously enter data into their respective portions of the user interface 200.

Further, the second user 210 may be able to witness and/or validate the data that the first user 220 has entered. Because both the first user 220 and the second user 210 are simultaneously authenticated, such a witness or validation may only require the second user 210 to touch a user interface element. In contrast, within conventional systems, the first user 220 would need to log out. The second user 210 would then need to authenticate into the system, validate the information, and log out of the system. The first user 220 would then need to log back into the system in order to continue work. Accordingly, the present system provides significant benefits with just-in-time authentication. Additionally, one will appreciate that while this example only utilized two users, in various additional or alternative embodiments, more than two users may be similarly authenticated into a single user interface 200.

Figure 3:
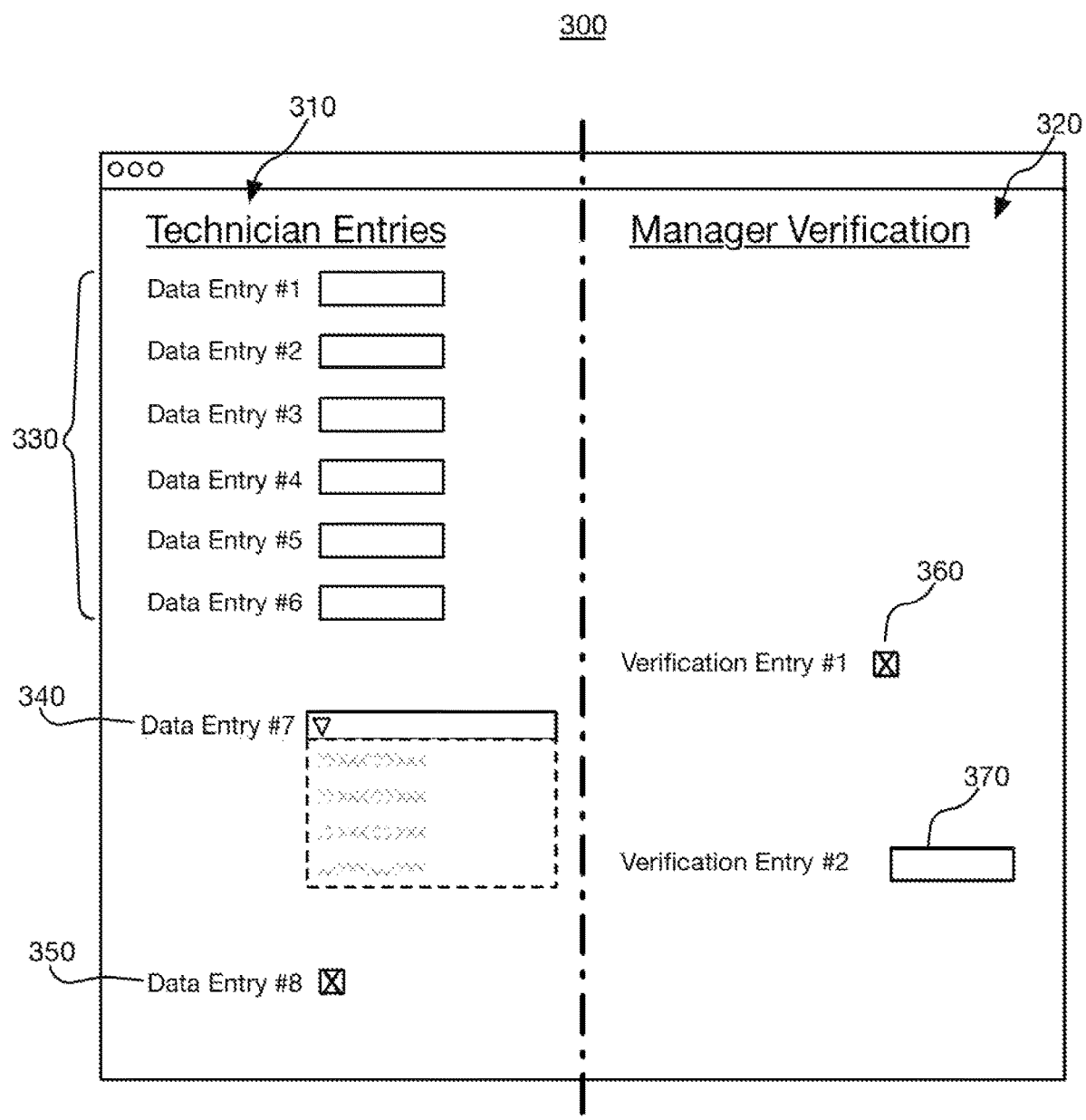
FIG. 3 illustrates a schematic of a user interface with a first portion and a second portion.

FIG. 3 illustrates a schematic of a user interface 300 with a first portion 310 and a second portion 320. As explained above, the first portion may be associated with a first permission attribute of a first user, such as a quality assurance technician. Similarly, the second portion may be associated with a second permission attribute of a second user, such as a quality assurance manager. The computer system 110 receives, from one or more proximity sensors 130, a proximity of the second user 210 relative to the user interface 300 (also shown as 200 in FIG. 2). Additionally, the computer system 110 receives, from one or more identity-verification sensors 120, a verification of an identification of the second user 210. The computer system 110 then activates the second portion 320 of the user interface 300 for interaction from the second user 210.

In at least one embodiment, the first portion 310 of the user interface 300 and the second portion 320 of the user interface 300 are displayed simultaneously. Alternatively, the first portion 310 of the user interface 300 and the second portion 320 of the user interface 300 may comprise separate and distinct user interfaces such that only one portion is depicted at a time. For example, in the depicted example, the first portion 310 comprises technician entries that include data entry text fields 330, drop down menus 340, and check boxes 350. The second portion 320 comprises manager verification fields that include check boxes 360 and data entry text fields 370. One will appreciate, however, that these user interface elements 330, 340, 350, 360, 370 are merely exemplary and that any form of user interface elements may be used.

In at least one embodiment, when the first portion 310 of the user interface 300 and the second portion 320 of the user interface 300 are displayed simultaneously, the second portion 320 of the user interface is grayed-out or otherwise visually set-apart as being locked for editing until the second user 210 authenticates with the system. For example, in at least one embodiment, a data entry text field may be grayed out, or otherwise not accept input, until the computer system 110 determines that the second user 210 is both within a threshold distance from the user interface 300 and the computer system 110 verifies the identity of the second user 210. Once the second user 210 has been authenticated, the computer 110 allows data entry into the second portion 320 of the user interface.

Additionally, in some embodiments machine learning may be used to assist with the just-in-time authentication. For example, the machine learning may be used to track and predict what user interfaces will be utilized at a given time and given location. Using this information, the machine learning algorithms can proactively prepare to authenticate specific users based upon the prediction that the specific users will be interacting with a particular user interface at a particular time. In contrast, the machine learning algorithm may identify potential attempted breaches by identifying a specific user interacting with a user interface in a non-predicted way.

Further, the machine learning may track and/or predict the physical location of various users within a physical facility. As such, the machine learning algorithm may determine which user interface a user is traveling towards. Similarly, the machine learning algorithm may identify when a specific user is not by a particular user interface and use that information to prevent any attempts to authenticate that specific user at that particular user interface.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
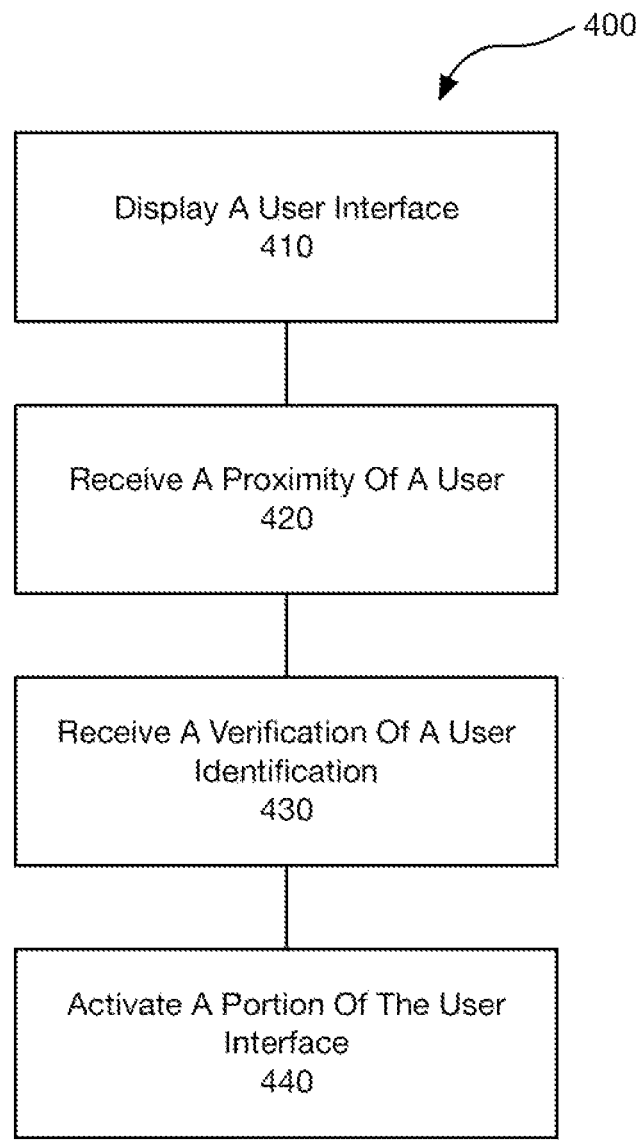
FIG. 4 illustrates a flow chart of steps within a method for just-in-time authentication.

FIG. 4 illustrates a flow chart of steps within a method 400 for just-in-time authentication. The method 400 includes an act 410 of displaying a user interface. Act 410 includes displaying a user interface comprising a first portion and a second portion. The first portion is associated with a first permission attribute, and the second portion is associated with a second permission attribute. The first permission attribute is associated with a first user and the second permission attribute is associated with a second user. For example, the user interface 200 of FIG. 2 may comprise multiple portions (both displayed and not displayed). The different portions may be associated with different permissions.

Method 400 also includes an act 420 of receiving a proximity of a user. Act 420 comprises receiving, from one or more proximity sensors, a proximity of the second user relative to the user interface. For example, the proximity sensors 130 of FIG. 1 communicate a user's proximity to the proximity module 170. The proximity data may be gathered from a number of different types of sensors.

Additionally, method 400 includes an act 430 of receiving a verification of a user identification 430. Act 430 comprises receiving, from an identity-verification sensor, a verification of an identification of the second user. For example, the identity-verification module 180 of FIG. 1 verifies the identity of a user using identity-verification sensors such as biometric sensors.

Further, method 400 includes an act 440 of activating a portion of the user interface 440. Act 440 comprises activating the second portion of the user interface for interaction from the second user. For example, once a user has had their identification validated and it is determined that they are within a threshold distance of a user interface, the computer system 110 activates the portion of the user interface that corresponds with the user's permissions.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium.

Transmissions media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for just-in-time authentication, comprising:
    one or more processors; and
    one or more computer-readable media having stored thereon executable instructions that when executed by the one or more processors configure the computer system to:
        display a user interface simultaneously comprising a first portion and a second portion, wherein:
            the first portion is associated with a first permission attribute of a first user,
            the first portion comprises a first set of user data-entry features,
            the second portion is associated with a second permission attribute of a second user, wherein the second permission attribute is different than the first permission attribute, and
            the second portion comprises a second set of user data-entry features, wherein the second set of user data-entry features is different than the first set of user data-entry features;
        receive, from one or more proximity sensors, a proximity of the first user relative to the user interface;
        receive, from one or more identity-verification sensors, a verification of an identification of the first user;
        activate the first portion of the user interface for interaction from the first user, wherein activating the first portion comprises permitting the first user to enter data into the computer system using the first portion;
        receive, from one or more proximity sensors, a proximity of the second user relative to the user interface;
        receive, from one or more identity-verification sensors, a verification of an identification of the second user;
        prior to activating the second portion:
            determine that the second user is within a threshold distance from the user interface, and
            based on a proximity of the second user to the user interface, deauthenticate the first user, wherein deauthenticating the first user comprises disabling data entry into the computer system through use of the first portion of the user interface; and
        activate the second portion of the user interface for interaction from the second user, wherein activating the second portion comprises permitting the second user to enter data into the computer system using the second portion.

2. The computer system of claim 1 wherein the executable instructions include instructions that are executable to configure the computer system to:
    determine that the second user is closer to the user interface than the first user before activating the second portion of the user interface for interaction from the second user.

3. The computer system of claim 1, wherein the one or more proximity sensors and the one or more identity-verification sensors comprise the same physical sensor.

4. The computer system of claim 3, wherein the one or more proximity sensors and the one or more identity-verification sensors comprise a facial recognition sensor that is configured to track gaze direction.

5. The computer system of claim 4, wherein receiving, from the one or more proximity sensors, the proximity of the second user relative to the user interface comprises detecting, with the facial recognition sensor, that the second user is gazing at the user interface.

6. The computer system of claim 5, wherein receiving, from the one or more identity-verification sensors, the verification of the identification of the second user comprises detecting, with the facial recognition sensor, that the second user is gazing at the user interface.

7. A computer-implemented method for just-in-time authentication, executed on one or more processors, the computer-implemented method comprising:
    displaying a user interface simultaneously comprising a first portion and a second portion, wherein:
        the first portion is associated with a first permission attribute of a first user,
        the first portion comprises a first set of user data-entry features,
        the second portion is associated with a second permission attribute of a second user, wherein the second permission attribute is different than the first permission attribute, and
        the second portion comprises a second set of user data-entry features, wherein the second set of user data-entry features is different than the first set of user data-entry features;
    receiving, from one or more proximity sensors, a proximity of the first user relative to the user interface;
    receiving, from one or more identity-verification sensors, a verification of an identification of the first user;
    activating the first portion of the user interface for interaction from the first user, wherein activating the first portion comprises permitting the first user to enter data into the first portion of the user interface;
    receiving, from one or more proximity sensors, a proximity of the second user relative to the user interface;
    receiving, from one or more identity-verification sensors, a verification of an identification of the second user;
    prior to activating the second portion:
        determining that the second user is within a threshold distance from the user interface, and
        based on a proximity of the second user to the user interface, deauthenticating the first user, wherein deauthenticating the first user comprises disabling data entry into the first portion of the user interface; and
    activating the second portion of the user interface for interaction from the second user, wherein activating the second portion comprises permitting the second user to enter data into the second portion of the user interface.

8. The computer-implemented method of claim 7, further comprising:

determine that the second user is closer to the user interface than the first user before activating the second portion of the user interface for interaction from the second user.

9. The computer-implemented method of claim 7, wherein the one or more proximity sensors and the one or more identity-verification sensors comprise the same physical sensor.

10. The computer-implemented method of claim 9, wherein the one or more proximity sensors and the one or more identity-verification sensors comprise a facial recognition sensor that is configured to track gaze direction.

11. The computer-implemented method of claim 10, wherein receiving, from the one or more proximity sensors, the proximity of the second user relative to the user interface comprises detecting, with the facial recognition sensor, that the second user is gazing at the user interface.

12. The computer-implemented method of claim 11, wherein receiving, from the one or more identity-verification sensors, the verification of the identification of the second user comprises detecting, with the facial recognition sensor, that the second user is gazing at the user interface.

13. A computer-readable media comprising one or more physical computer-readable storage media having stored thereon computer-executable instructions that, when executed at a processor, cause a computer system to perform a method for just-in-time authentication, executed on one or more processors, the method comprising:
displaying a user interface simultaneously comprising a first portion and a second portion, wherein:
the first portion is associated with a first permission attribute of a first user,
the first portion comprises a first set of user data-entry features,
the second portion is associated with a second permission attribute of a second user, wherein the second permission attribute is different than the first permission attribute, and
the second portion comprises a second set of user data-entry features, wherein the second set of user data-entry features is different than the first set of user data-entry features;
receiving, from one or more proximity sensors, a proximity of the first user relative to the user interface;
receiving, from one or more identity-verification sensors, a verification of an identification of the first user;
activating the first portion of the user interface for interaction from the first user, wherein activating the first portion comprises permitting the first user to enter data into the computer system using the first portion;
receiving, from one or more proximity sensors, a proximity of the second user relative to the user interface;
receiving, from one or more identity-verification sensors, a verification of an identification of the second user;
prior to activating the second portion:
determining that the second user is within a threshold distance from the user interface, and
based on a proximity of the second user to the user interface, deauthenticating the first user, wherein deauthenticating the first user comprises disabling data entry into the computer system through use of the first portion of the user interface; and
activating the second portion of the user interface for interaction from the second user, where activating the second portion comprises permitting the second user to enter data into the computer system using the second portion.

* * * * *